S. Taber,
Lifting Jack.

Nº 65,447.      Patented June 4, 1867.

Witnesses:
Theo Tusche
Wm Trewin

Inventor:
Seman Taber
Per Munn & Co
Attorneys

UNITED STATES PATENT OFFICE.

SEMAN TABER, OF ST. JOSEPH, MISSOURI.

IMPROVEMENT IN LIFTING-JACKS.

Specification forming part of Letters Patent No. 65,447, dated June 4, 1867.

*To all whom it may concern:*

Be it known that I, SEMAN TABER, of St. Joseph, in the county of Buchanan and State of Missouri, have invented a new and Improved Jack for Raising and Leveling Railroad-Tracks; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved jack for raising and leveling railroad-tracks.

The object of the invention is to obtain a simple and portable device for the purpose specified, one which may be manipulated and applied with the greatest facility, and constructed at a moderate cost.

Figure 1:
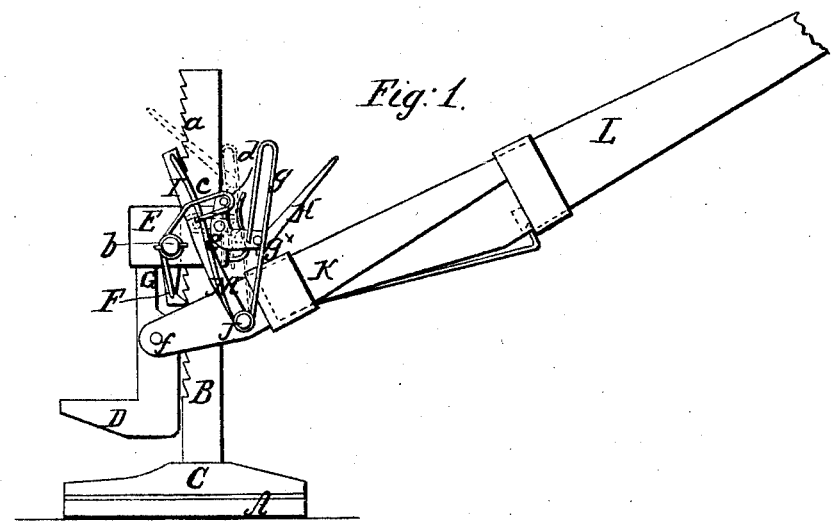
Figure 2:
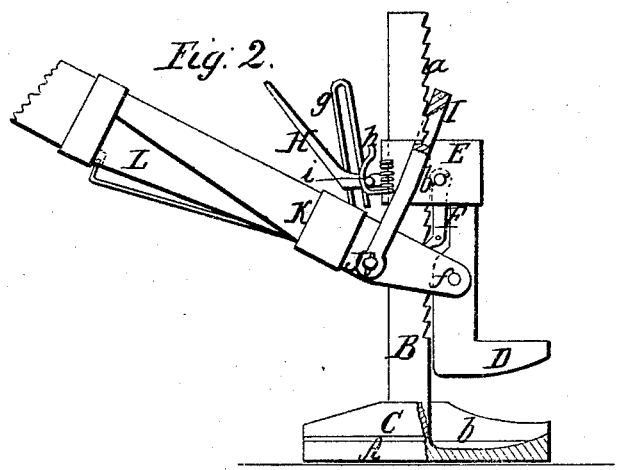

In the accompanying sheet of drawings, Figures 1 and 2 are side views of my invention, the side shown in Fig. 1 being opposite to that shown in Fig. 2.

Similar letters of reference indicate like parts.

A represents a base-plate, which may be constructed of hard wood, and B is an upright metal bar having a rack, $a$, at one side, the other sides being perfectly smooth. The lower end of the rack-bar B is attached to a metal strip, C, which is secured to the base A, and holds the bar firmly in position, said strip being provided with an oblong recess, $b$, to receive the lifting-hook when the latter is down to its fullest extent.

D is the lifting-hook, which may be of steel, and has a wrought-iron strap or band, E, attached to its upper end, and which works on the upright rack-bar B. In this strap or band there is placed a holding dog or pawl, F, which has a spring, G, applied to it, said spring having a tendency to keep the dog or pawl engaged with the rack $a$ of the bar B. This spring G is connected to the lower part of the dog or pawl, and, extending upward, is wound two three times around its pin $b$, and is then bent to form a loop, $c$, which is slightly inclined from a horizontal position, as shown in Fig. 1, and has the pin $d$ at the end of the short arm of a lever, H, fitted in it, the fulcrum $e$ of said lever passing into the strap or band E.

I represents a lifting pawl or dog, constructed of loop form, so that it may straddle or fit over the strap or band E. This pawl or dog has its lower ends fitted loosely on the ends of a pin, J, which passes transversely through a socket, K, the latter having a wooden handle or lever, L, fitted in it. The socket K is attached, by a fulcrum-pin, $f$, with the lifting-hook D.

M is a spring, which is wound two or three times around one end of the pin J, one part extending upward, and fitted in the upper part of the lifting pawl or dog, while the other part extends upward, and is bent to form a loop, $g$, to receive a pin, $g^\times$, on the lever H. This lever H has a spring, $h$, bearing against it, said spring being attached to the strap or band E, and bearing against a pin, $i$, on the lever, as shown in Fig. 2. This spring $h$ has a tendency to keep the lever H in proper position, or prevent it from casually moving out of either of the two positions in which it is placed.

In using the device, the lever H is adjusted in an outward position, as shown in Fig. 2, and the pin $d$ in the loop $c$ causes the spring G to keep the dog or pawl F engaged with the rack $a$, while the pin $g^\times$ in the loop $g$ causes the lifting pawl or dog to engage with the rack $a$.

It will be seen, therefore, that by adjusting the device so that the hook D will be under the part of the track to be raised, and then operating the lever L, the hook D and track will be raised at each depression of the lever L, in consequence of the lifting-pawl I engaging with the rack $a$ and holding the fulcrum-pin J of the lever L, and, when said lever is raised, the pawl or dog F holding the lifting-hook while the lever L is raised.

The lifting-hook may be lowered at any time by adjusting the lever H inward, whereby the springs M G will be so moved or actuated as to free the pawls or dogs from the rack $a$ when the lever L is slightly elevated.

Having thus described my invention, I claim as new and desire to secure by Letters Patent—

The construction and arrangement of the pawls or dogs F I, springs G, M, and $i$, levers H, lifting-hook D, rack-bar B, and socket K in the handle L, substantially as described, for the purpose specified.

SEMAN TABER.

Witnesses:
W. L. PARKER,
C. HARTZELL.